June 8, 1926.
J. S. ARIENTA
TIRE RIM
Filed July 7, 1925
1,588,220
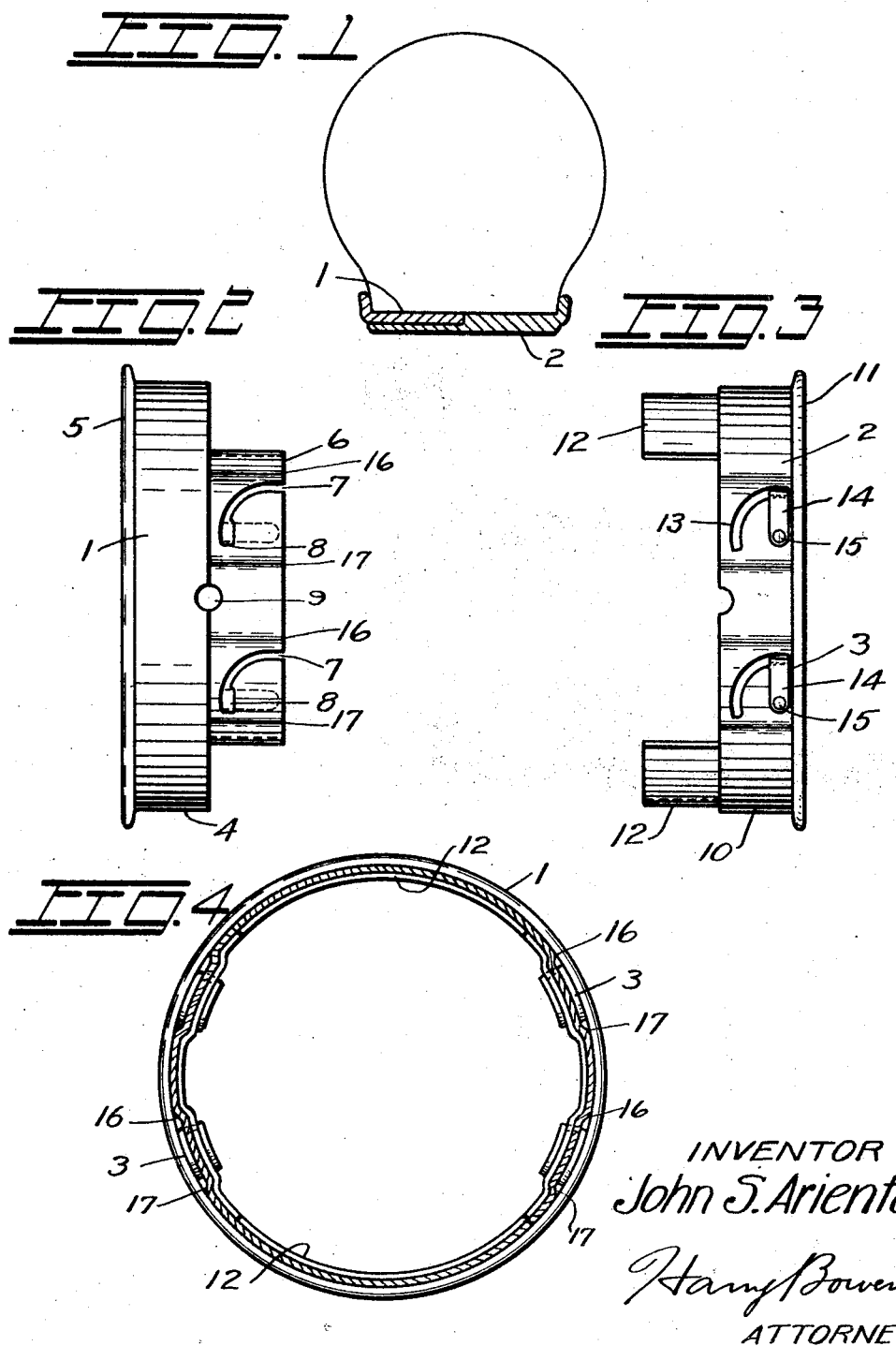
INVENTOR
John S. Arienta
Harry Bowen
ATTORNEY Patented June 8, 1926.

1,588,220

UNITED STATES PATENT OFFICE.

JOHN S. ARIENTA, OF SEATTLE, WASHINGTON.

TIRE RIM.

Application filed July 7, 1925. Serial No. 41,946.

The invention is a separable tire rim from which tires may be quickly removed and replaced.

The object of the invention is to provide a separable rim for holding motor vehicle tires which is securely locked and which will make it possible to change the tire very quickly.

Another object of the invention is to provide a collapsible rim which is held on both sides of the center.

A further object of the invention is to provide a collapsible rim having a plurality of locks that are permanently attached to the rim.

And a still further object of the invention is to provide a rim for motor vehicle tires which is made in sections and at the same time is of a simple and economical construction.

With these ends in view, the invention embodies a rim made of two circular sections with segmental lap joints and U clips slidable in slots for locking the sections together.

Other features and advantages of the invention will appear from the following description, taken in connection with the drawings, wherein:—

Figure 1 is a cross section showing the overlapping sections of the rim.

Figure 2 is a side view of one of the sections.

Figure 3 is a similar view of the other section.

Figure 4 is an edge view with the flange omitted.

In the drawings I have shown my device as it would be made wherein numeral 1 indicates one section of the rim, numeral 2 the other section and numeral 3, the locking member.

The section 1 is made of a flat circular band 4 having a flange 5 at one edge and segmental projections 6 extending laterally from two points of the opposite edge. The projections 6 are substantially one quarter of a circle in length and each extend outward from the inner edge of the section 4 and on opposite sides of the circle. These sections 6 are provided with curved openings 7 having notches 8 at their inner ends and the section 1 is provided with an opening 9 for the valve stem of the tire.

The section 2 is also formed of a flat circular band which is indicated by the numeral 10 and this band has a flange 11 at one side and segmental projections 12 extending outward from the opposite side which will fit inside of the band 4 and between the projections 6 of the member 1. The projections 12 are plain as shown and are not provided with openings. The band 10 is provided with curved openings 13 that are similar to the openings 7 and in these openings are U shaped clamps 14 which are pivoted above and below the band 10 on pins 15. It will be observed that as the band 1 is placed against the band 2 with the projections 6 and 12 extending inside of the band, the clamps 14 will pass into the openings 7 and as the clamps are moved through one quarter of a circle so that they will spring into the notches 8 at the inner end of the openings 7, the two sections 1 and 2 will be positively locked together. It will also be observed that portions of the bands and projections are indented between the points 16 and 17 as shown in Figure 4 so that the outer surfaces of the clamps 14 will be flush with the outer surface of the bands 4 and 10.

The construction will be readily understood from the foregoing description. To use the device, the two sections may be made as shown and it will be observed that the tire may be placed on the section 1 and the section 2 may be placed against it with the projections 6 and 12 extending inside of the sections. It will then be seen that the clamps 14 may be moved around to a transverse position as shown in dotted lines in Figure 2 to positively lock the two sections together. It will then be observed that when it is desired to remove the tire, the clamps 14 may readily be moved back to the position shown in Figure 3 so that the two sections may be readily separated and the tire removed. It will be observed that this rim is particularly adaptable for balloon tires or any tire having considerable width.

Having thus fully described the invention, what I claim as new and desire to secure by Letters Patent, is:—

1. In a tire rim, two circular halves with flanges at their outer edges and projections at their inner edges, some of the said projections having curved slots therein and U shaped locking members in one of the said halves to engage the said slots to hold the two halves together.

2. In a tire rim, two circular halves with flanges at their outer edges and projections at their inner edges, some of the said projections having curved slots therein and U shaped locking members pivotally mounted in one of the said halves to engage the said slots to hold the two halves together.

JOHN S. ARIENTA.